United States Patent [19]
Hirano et al.

[11] Patent Number: 5,363,545
[45] Date of Patent: Nov. 15, 1994

[54] METHOD OF PRODUCING A COUPLING FOR OIL COUNTRY TUBULAR GOODS

[75] Inventors: Yutaka Hirano; Masayuki Tsuji; Hironobu Sakakibara, all of Aichi, Japan

[73] Assignee: Kawatetsu Tubic Co., Ltd., Japan

[21] Appl. No.: 121,208

[22] Filed: Sep. 14, 1993

[30] Foreign Application Priority Data

Sep. 14, 1992 [JP] Japan .................. 4-244465

[51] Int. Cl.$^5$ .............................. B23P 17/00
[52] U.S. Cl. ..................... 29/527.4; 29/557; 166/242; 265/332.2; 265/332.3
[58] Field of Search .............. 29/527.4, 426.5, 458, 29/557, 33 D; 166/242; 285/332.2, 332.4, 332.5

[56] References Cited

U.S. PATENT DOCUMENTS

| | | | |
|---|---|---|---|
| 2,110,779 | 3/1938 | Texter | 166/242 |
| 2,111,196 | 3/1938 | Texter | 166/242 |
| 2,313,861 | 3/1943 | Caldwell | 285/332.4 |
| 2,532,632 | 12/1950 | MacArthur | 285/332.2 X |
| 3,015,500 | 1/1962 | Barnett | 285/332.3 X |
| 4,026,583 | 5/1977 | Gottlieb | 285/332.2 X |
| 4,770,444 | 9/1988 | Hauk | 29/458 X |
| 4,974,882 | 12/1990 | Watts | 285/333 |

FOREIGN PATENT DOCUMENTS

| | | | |
|---|---|---|---|
| 243307 | 4/1926 | United Kingdom | 166/242 |
| 777783 | 6/1957 | United Kingdom | 285/332.4 |

*Primary Examiner*—Carl J. Arbes
*Attorney, Agent, or Firm*—Austin R. Miller

[57] ABSTRACT

Producing a coupling for oil country tubular goods having a metal seal and a screw thread tapered toward its end. A plain pipe is cut to a predetermined length and hot-forged with longitudinal compression to form a predetermined thickened shape of its inside surface. After quenching and tempering, the outside surface of the pipe is machined, and the inside surface is machined and is then threaded. The pipe is coated or plated.

4 Claims, 5 Drawing Sheets

METHOD OF PRODUCING A COUPLING FOR OIL COUNTRY TUBULAR GOODS

BACKGROUND OF THE INVENTION

1. Field of the Invention

The present invention relates to a method of producing a coupling, preferably a coupling for oil country tubular goods (hereinafter referred to as an O.C.T.G.) having a special screw thread.

2. Description of the Related Art

Very deep oil wells are being drilled lately. Accordingly, the steel pipes and couplings used for such wells need higher strength.

Various couplings for tubing or casings have been developed in strength and dementional accuracy, for example, couplings having special screw threads, such as a so-called VAM coupling or a FOX coupling, as disclosed in Japanese Patent Laid-open No. 60-69385 (and as shown in FIG. 5).

As shown in FIG. 5, such a threaded coupling 1 has metal seals 1a provided at an Internal Bore Dimension 1d thereof, and special screw threads 1c tapered from the Internal Bore Dimension 1d toward the ends 1b, thereby achieving good sealing.

According to the conventional method, such special pipe couplings are produced by a process as illustrated in FIG. 7. A plain pipe 8 for a coupling 1, as shown in FIG. 6, has an outside diameter Ds slightly greater than the outside diameter Dc required for the coupling 1, and has a wall thickness ts slightly greater than the maximum wall thickness tmax required for the coupling 1. After the entire plain pipe 8 is heat-treated, that is, quenched and tempered, it is cut into pipe pieces having a predetermined length Ls. The outside surfaces of the pieces are finished on a lathe turning machine, and their inside surfaces are also machined and then threaded on a lathe turning machine. Finally, the pieces are coated or plated.

The above conventional method is described in Japanese Patent Laid-open No. 56-24277, column 2, line 17-20, translated as follows. "Because such a known coupling is formed substantially by turning the inside surface of a coupling material having a wall thickness greater than the final wall thickness by a thickness of a shoulder portion 2, the process takes a long time, and produces a considerably large amount of material waste."

Because the method must use a plain pipe having a wall thickness equal to or greater than the final maximum wall thickness of the coupling, the production yield results in very low amount. Further, because a significantly large amount of material must be machined, the working efficiency of the turning process becomes significantly low.

SUMMARY OF THE INVENTION

Further, Japanese Patent Laid-open No. 55-92246 discloses a method of producing a coupling for piping by employing a forging process, in which a red-heated round bar is pressed in forging die means comprising male and female dies to form a tubular body having a closed end, and then a portion including the closed end is cut off to obtain a desired coupling.

However, because this method uses a round bar as a material, the method cannot be applied to the production of a coupling having a special screw thread as disclosed in this specification, since it is impossible by the method to produce by press-forming the Internal Bore Dimension which improves sealing property. In addition, because, in this method, the closed end portion of a forged tubular body must be cut off, the method requires an extra step after the forging process.

Accordingly, an object of the present invention is to provide a method of producing a coupling for O.C.G.T. which overcomes the problems of the conventional art. To achieve the above objects, the present invention provides a method of producing a coupling for O.C.G.T. having a metal seal and a screw thread tapered toward an end thereof, the method comprising the steps of: cutting a plain pipe into a predetermined length; hot forging the thus-cut plain pipe so that the inside surface thereof is deformed to achieve a predetermined thickened shape; quenching and tempering the forged piece; machining an outside surface of the forged piece into a final dimensions; machining the inside surface of the forging into a predetermined shape; threading the inside surface of the forging; and coating or plating the threaded coupling.

DETAILED DESCRIPTION OF THE INVENTION

Figure 1:
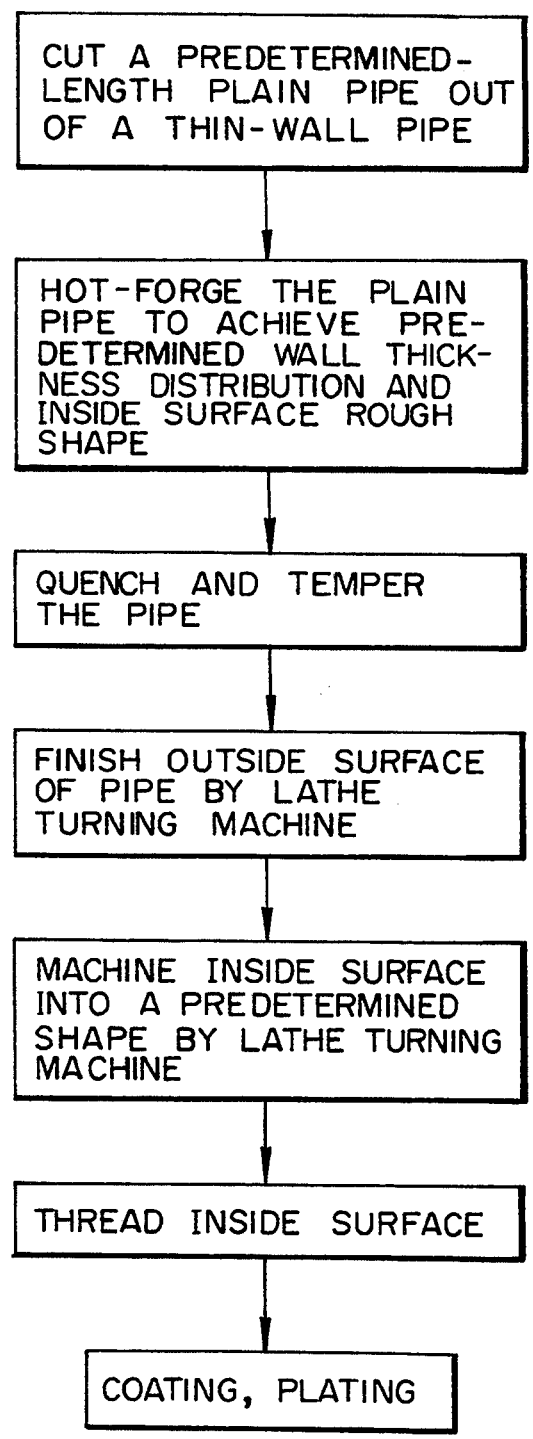
FIG. 1 is a flow chart of a method of producing a coupling for O.C.T.G. according to the present invention.

Referring to FIG. 1, a plain pipe for a coupling is cut to a predetermined length. More specifically, a predetermined-length plain pipe having an outside diameter $D_0$, a wall thickness $t_0$ and a length $L_0$ is cut from a long plain pipe having an outside diameter $D_0$ and a wall thickness $t_0$. The steps referred to in FIG. 1 are performed.

Figure 2A:
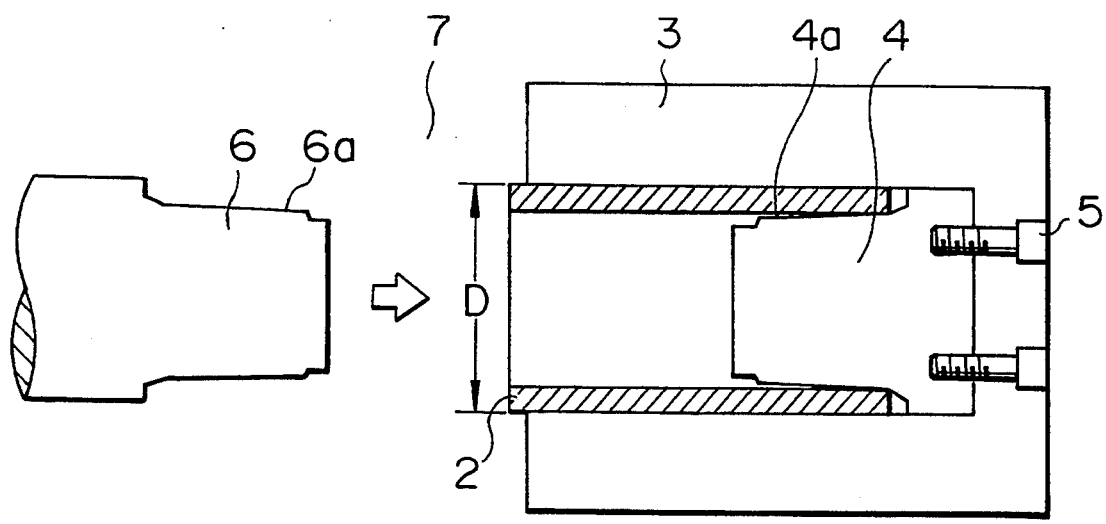
FIGS. 2(a) and 2(b) are cross views illustrating forging a plain pipe into a coupling by hot forging in accordance with this invention.
Figure 2B:
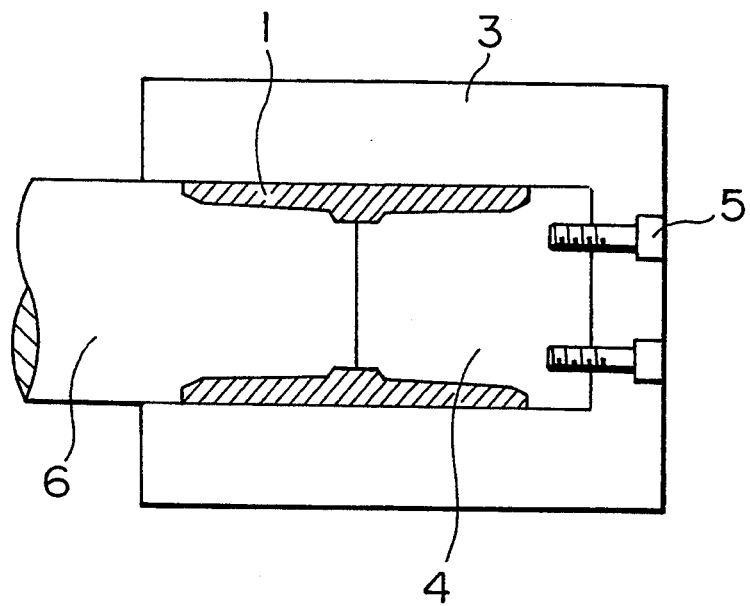
Figure 3:
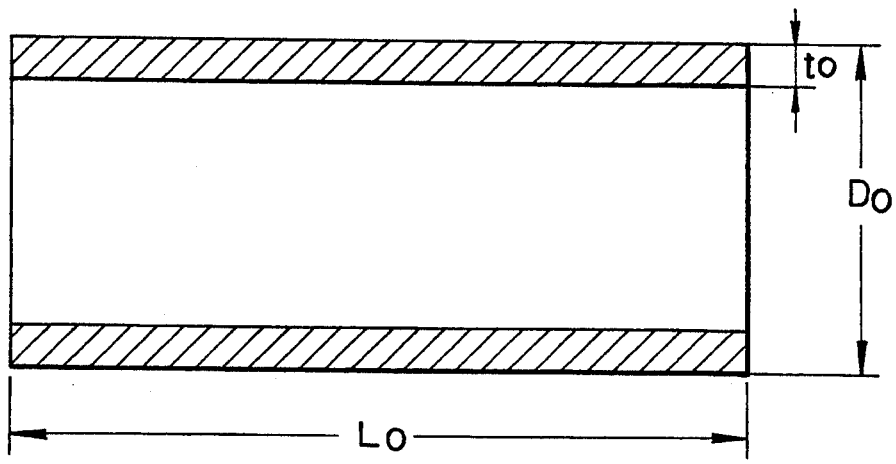
FIG. 3 shows dimentions of pipe piece cut from plain pipe in a predetermined-length used for the practice of the present invention.

The cut plain pipe is hot-forged using a forging machine of the type shown in FIGS. 2(a) and 2(b). The forging machine has an outer die 3 having an inside diameter D that is slightly greater than the outside diameter Dc of the coupling 1 (FIG. 2(b)). The hot-forging machine has an inner die 4 fixed to the inside bottom surface of the outer die 3 by bolts 5. The inner die 4 has an outside surface 4a having a shape corresponding to the desired shape of the lower half portion of the inside surface of the desired (target) coupling 1. The forging machine further comprises a punch 6 having an outside surface 6a (FIG. 2(a)) which is formed in a shape corresponding to the desired shape of the upper half portion of the inside surface of the coupling 1.

The forging process is exemplified in FIGS. 2(a) and 2(b). Plain pipe 2 having a thickness less than portions of the target coupling is heated to a predetermined temperature in a furnace and is inserted into the forging machine 7 as shown in FIG. 2(a). The plain pipe 2 is forged, with longitudinal compression and internal deformation, so as to achieve a coupling having predetermined wall thickness and shape distribution accompanied by localized increases of wall thickness, using the punch 6 and die 4, as shown in FIG. 2(b). The forging process thickens certain portions of the wall of the coupling, as will be seen by comparing the relatively thin-walled pipe 2 of FIG. 2(a) with the relatively thickened central portions of the product after forging as seen in FIG. 2(b).

Subsequently, heat treatments such as quenching and tempering are performed, preferably by utilizing the residual heat of the forging.

The heat-treated coupling 1 is machined on a lathe. The outside surface is finished and the inside surface is machined and threaded.

After dimensional and visual inspections of the threaded portion, coupling is coated or plated and become ready for use.

According to the method of the present invention, a predetermined-length plain pipe is used to having a comparatively thin wall thickness, at least some portions of the wall, smaller than the thickness of the desired coupling, is hot-forged so as to deform the interior of the pipe to increase its wall thickness at certain locations and thereby to achieve both a maximum wall thickness and a predetermined shape of the inside surface. Because of this the amount of time required for the process can be significantly reduced, thereby enhancing working efficiency and yield.

Further, because the residual heat resulting from the forging process can be used for subsequent heat treatments including quenching and tempering, the amount of energy required for the process can be reduced.

EXAMPLE

An example of the present invention will be described hereinafter. It is not intended to limit or to define the scope of the invention, which is defined in the appended claims.

Special couplings of L80 carbon steel having a nominal outside diameter of 3½ and a weight of 9.2 LBS/FT were formed according to the present invention.

Predetermined-length Plain Pipe

Figure 5:
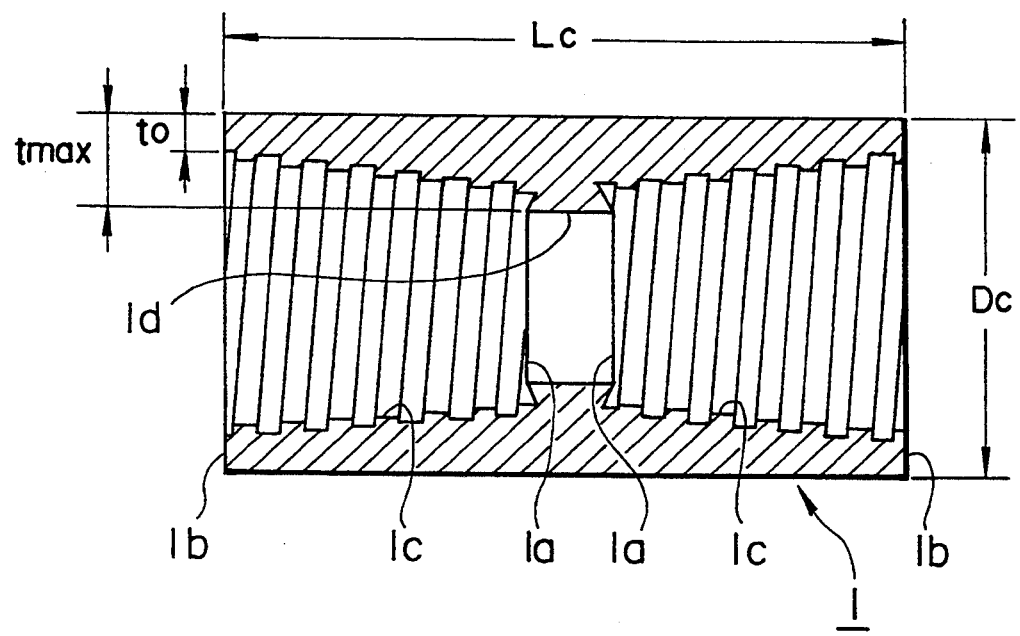
FIG. 5 is a cross sectional view of a special coupling for O.C.T.G.
Figure 6:
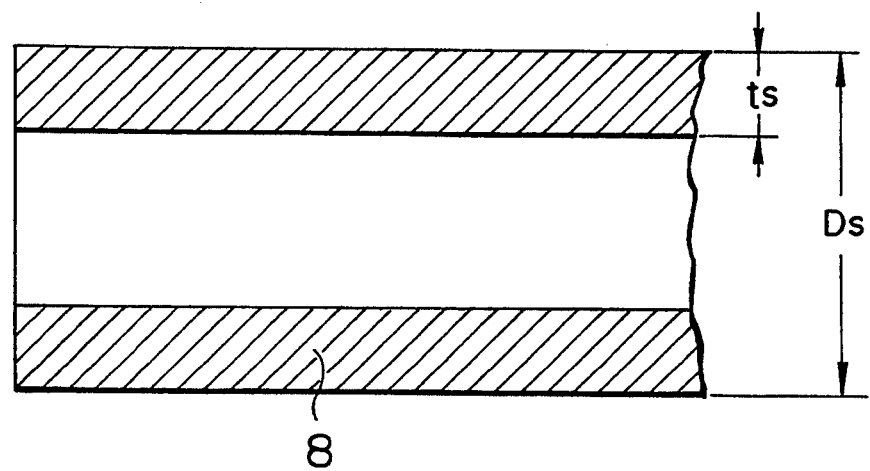
FIG. 6 is a cross sectional view of a plain pipe used for the conventional method of producing a special coupling for O.C.T.G.
Figure 7:
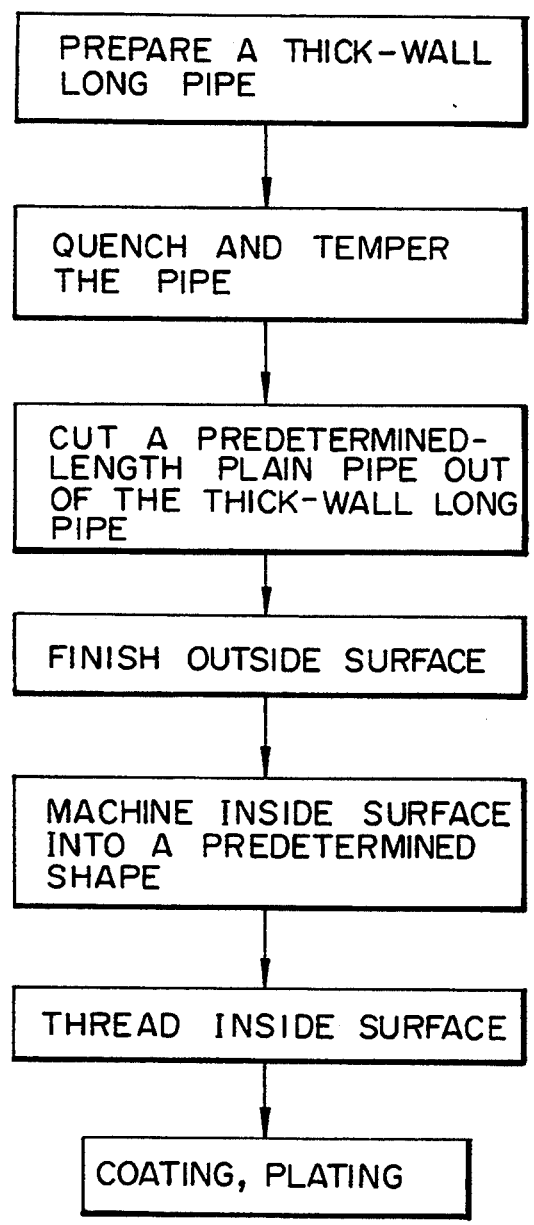
FIG. 7 is a flow chart of a conventional method of producing a special coupling for O.C.T.G.

The predetermined-length plain pipes used in this example had the following dimensions:
Outside Diameter $D_0 = 101.6$ mm
Wall Thickness $t_0 = 10.53$ mm
Lengths $L_0 = 215$–$220$ mm The wall thickness $t_0$ of the predetermined-length plain pipe 2 is preferably about 50–70% of the maximum wall thickness tmax of, for example, a coupling 1 as shown in FIG. 5. The length $L_0$ is preferably about 110–140% of the length $L_c$ of the coupling 1.

Forging Conditions

Five groups of the above-described predetermined-length plain pipes (each group including five plain pipes) were forged by using a hydraulic upsetter of 300 ton under the each condition as shown in Table 1.

TABLE 1

| Group | Heating Temperature (°C.) | Upper and Lower Clamp Pressure Kg/cm² (ton) | Forging Pressure Kg/cm² (ton) | Length before Forging (mm) | Remarks |
|---|---|---|---|---|---|
| a | 1,250 | 600 (258) | 550 (237) | 220 | Example of the |
| b | 1,250 | 600 (258) | 550 (237) | 217 | Invention |
| c | 1,250 | 600 (258) | 550 (237) | 215 | |
| d | 1,250 | 650 (280) | 600 (258) | 217 | |
| e | 1,250 | 550 (237) | 450 (194) | 220 | Comparative Example |

Forging Results

Figure 4:
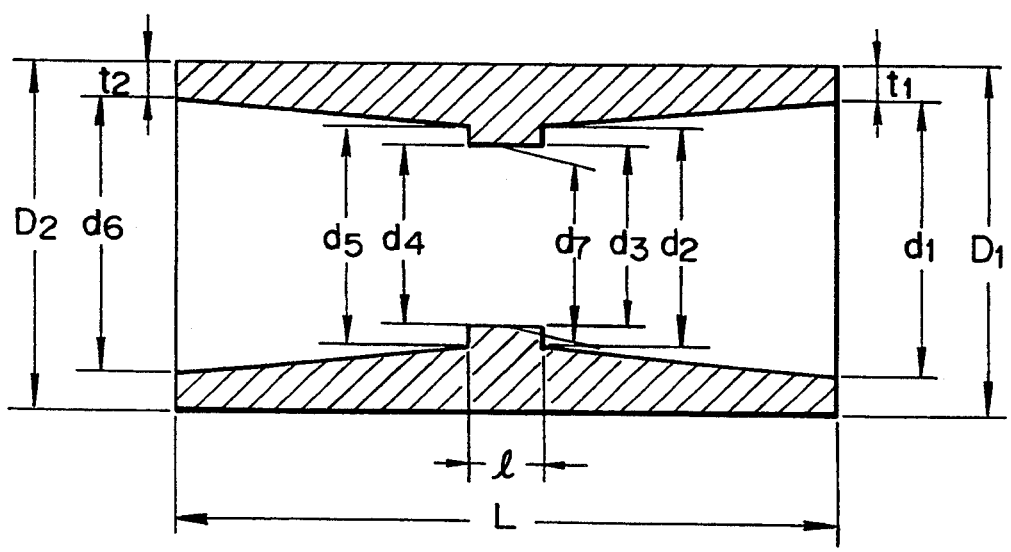
FIG. 4 shows dimensions of a hot-forged coupling in accordance with this invention.

The dimensions of the pipes forged under the above-mentioned conditions are shown in Table 2. The dimensional symbols $D_1$, $d_1$, etc., are illustrated in FIG. 4. As indicated in the Table 2, the plain pipes of group (e) failed to achieve the predetermined dimensions. More specifically, central projections thereof were not satisfactorily formed.

TABLE 2

| Dimension | $D_1$ | $d_1$ | $d_2$ | $d_3$ | $d_4$ | $d_5$ | $d_6$ | $d_7$ | $D_2$ | L | l | $t_1$ | $t_2$ |
|---|---|---|---|---|---|---|---|---|---|---|---|---|---|
| Desired Final Dimension of Coupling | 98.775 | 87.885 | 84.81 | 76.873 | 76.873 | 84.81 | 87.885 | 76.873 | 98.775 | 175.006 | 17.04 | 5.435 | 5.435 |
| Group a Actual | 103.68 | 82.30 | 76.78 | 71.98 | 70.45 | 76.59 | 81.88 | 70.21 | 103.75 | 180.40 | 25.78 | 10.76 | 11.09 |
| Deviation | 4.925 | 5.585 | 8.03 | 4.893 | 6.423 | 8.22 | 6.005 | 6.663 | 4.995 | 5.394 | 8.74 | 5.325 | 5.655 |
| Group b Actual | 103.58 | 82.16 | 76.71 | 73.18 | 71.86 | 76.39 | 81.64 | 70.39 | 103.54 | 180.89 | 25.53 | 10.55 | 10.90 |
| Deviation | 4.825 | 5.725 | 8.10 | 3.693 | 5.013 | 8.42 | 6.245 | 6.483 | 4.785 | 5.884 | 8.49 | 5.115 | 5.465 |
| Group c Actual | 103.29 | 81.81 | 76.49 | 73.00 | 71.64 | 76.39 | 82.01 | 70.19 | 103.91 | 180.50 | 25.55 | 10.73 | 11.03 |
| Deviation | 4.535 | 6.075 | 8.32 | 3.873 | 5.233 | 8.42 | 5.875 | 6.683 | 5.155 | 5.494 | 8.51 | 5.295 | 5.595 |
| Group d Actual | 103.81 | 82.21 | 76.88 | 72.23 | 70.85 | 76.73 | 81.78 | 70.03 | 104.03 | 181.25 | 25.74 | 10.76 | 11.01 |
| Deviation | 5.055 | 5.675 | 7.93 | 4.643 | 6.023 | 8.08 | 6.105 | 6.843 | 5.275 | 6.244 | 8.70 | 5.325 | 5.575 |
| Group e Actual | 103.45 | 82.50 | 78.52 | 77.70 | 77.21 | 78.24 | 81.90 | 77.43 | 103.60 | 195.59 | 25.82 | 10.48 | 10.85 |
| Deviation | 4.695 | 5.385 | 6.29 | −0.827 | −0.337 | 6.57 | 5.985 | −0.557 | 4.845 | 20.584 | 8.78 | 5.045 | 5.415 |

Note:
1) The meanings of the dimensional symbols are illustrated in FIG. 4.
2) The values in the upper row for each group indicate actual measurements of forged pipes. The values in the lower rows indicate differences between the measurements and the desired final dimensions; a negative value means that there was no allowance available for cutting.
3) Each measurement in the table is a mean value of five pipes.
4) All values are in mm

Further Processing and Results

After the forged pipes as indicated in Table 2 were quenched and tempered, the outside and inside surfaces of the forgings were finished on a lathe and the inside surfaces of the forgings were threaded. Coating or plating was subsequently performed.

The material characteristics and dimensions of the resulting couplings were examined. They indicated that the couplings of this invention achieved substantially the desired measurements and characteristics and were advantageous for several important reasons to be discussed in detail hereinafter. In all runs according to this invention the amount of time required for the production process was 13 minutes, achieving a very significant 15% reduction compared with the conventional method.

Further, the yield obtained in accordance with this invention was increased by an average of 16%. As will naturally be understood, the yield increases even further as the weight and size of the couplings increase.

Because the method of the present invention hot-forges a plain pipe having a comparatively thin wall thickness to produce a product having portions of thicker wall thickness it reduces production time, enhancing working efficiency. The method also significantly enhances yield.

In addition, because the residual heat resulting from the forging step can be used for performing a subsequent heat-treating step or steps, the amount of energy required for the overall process can be and is significantly reduced.

What is claimed is:

1. In a method of producing a coupling for oil country tubular goods having a metal seal portion and a screw thread portion tapered toward an end thereof, the steps which comprise:
   (a) cutting a pipe of a predetermined thickness to a predetermined length;
   (b) hot forging said pipe to deform its inside surface into a predetermined shape at least a portion of which has a thickness greater than said predetermined thickness;
   (c) quenching and tempering the resulting forging;
   (d) machining an outside surface of said forging into a final dimensions;
   (e) machining the inside surface of said forging into a predetermined shape; and
   (f) threading the inside surface of said forging.

2. The method defined in claim 1 wherein the wall thickness of said pipe used in step (a) is about 50–70% of the maximum wall thickness of the coupling produced.

3. The method defined in claim 1 wherein said step of hot forging is conducted with longitudinal compression of said pipe and wherein the original length of said pipe is about 110–140% of the length of the coupling produced.

4. The method defined in claim 1 including the further step of coating or plating the threaded coupling.

* * * * *